March 6, 1928.

T. HAWKINS

MOLDBOARD

Filed Oct. 30, 1925

T. Hawkins
INVENTOR

BY Victor J. Evans
ATTORNEY

E. R. Ruppert.

WITNESS:

Patented Mar. 6, 1928.

1,661,942

UNITED STATES PATENT OFFICE.

TOM HAWKINS, OF HOLLYWOOD, CALIFORNIA.

MOLDBOARD.

Application filed October 30, 1925. Serial No. 65,848.

This invention relates to improvements in plows, the general object of the invention being to so form the mold board of the plow that soil will not adhere to the same and the soil will be broken up or pulverized by the mold board.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
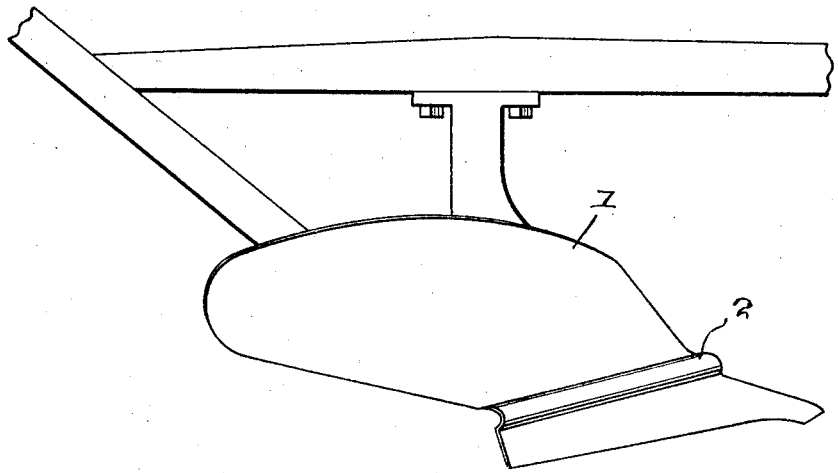
Figure 1 is a view of a plow showing my improved mold board in use.
Figure 2:
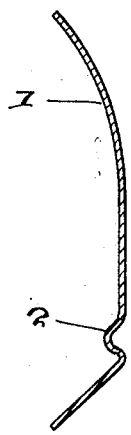
Figure 2 is a sectional view through the mold board.

As shown in these views, the mold board 1 of the plow is provided with a rib 2 which is of substantially semi-circular shape in cross section and projects outwardly from the outer face of the mold board. The rib extends transversely across the lower part of the mold board and is substantially parallel with the lower edge of the mold board.

This rib will engage the slice of soil being turned up by the plow so that the soil will be moved away from the major portion of the board and thus be prevented from sticking to the same. The rib also tends to break up the soil and pulverize it. Thus, this invention will not only save time, effort and labor but it improves the soil.

The drawing shows the rib as being formed by pressing the metal, but, of course, it will be understood that it may be formed in other ways.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A plow having a single rib horizontally arranged on its mold board and formed of semi-circular shape in cross section for causing the soil to move away from the major portion of the board and to pulverize the soil.

2. A plow having a mold board formed near its lower edge with an outwardly pressed rib substantially cylindrical in cross section and extending from the forward to the rear edge of the mold board in substantially parallel relation to the ground traveled through, the portion of the mold board above said rib being substantially vertical and flaring in one direction, and the portion of the mold board below the rib being disposed at an angle of substantially forty-five degrees to the surface of the ground traveled over.

In testimony whereof I affix my signature.

TOM HAWKINS.